S. CABOT.
SIGNALING SYSTEM.
APPLICATION FILED MAR. 10, 1906.

899,242.

Patented Sept. 22, 1908.
11 SHEETS—SHEET 3.

Fig. 3.

S. CABOT.
SIGNALING SYSTEM.
APPLICATION FILED MAR. 10, 1906.

899,242.

Patented Sept. 22, 1908.
11 SHEETS—SHEET 6.

WITNESSES:
Geo. K. Woodworth
G.A. Higgins

INVENTOR:
Sewall Cabot
by Alex. P. Browne
Attorney

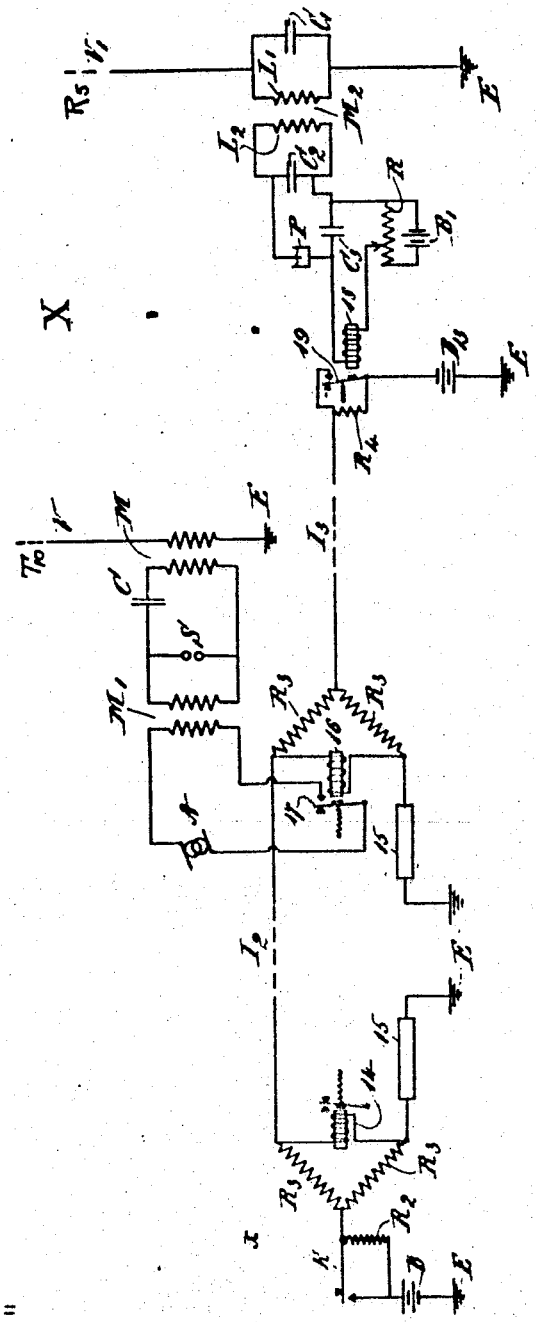

S. CABOT.
SIGNALING SYSTEM.
APPLICATION FILED MAR. 10, 1906.

No. 899,242.

Patented Sept. 22, 1908.
11 SHEETS—SHEET 8.

Witnesses:
Geo. W. Woodworth.
G. A. Higgins.

Inventor:
Sewall Cabot
by Alex. P. Browne.
Attorney.

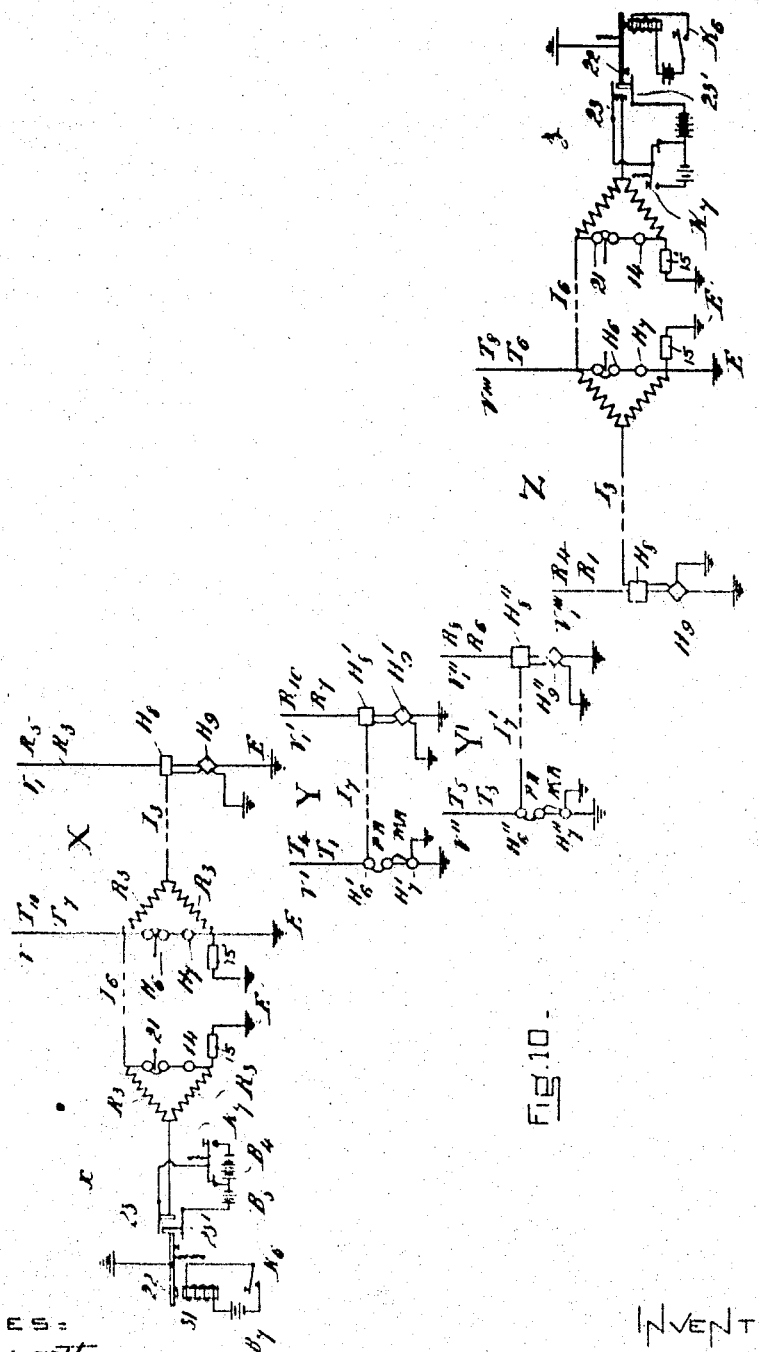

S. CABOT.
SIGNALING SYSTEM.
APPLICATION FILED MAR. 10, 1906.

899,242.

Patented Sept. 22, 1908.
11 SHEETS—SHEET 10.

UNITED STATES PATENT OFFICE.

SEWALL CABOT, OF BROOKLINE, MASSACHUSETTS, ASSIGNOR TO STONE TELEGRAPH AND TELEPHONE COMPANY, OF BOSTON, MASSACHUSETTS.

SIGNALING SYSTEM.

No. 899,242.　　　　Specification of Letters Patent.　　　　Patented Sept. 22, 1908.

Application filed March 10, 1906. Serial No. 305,263.

*To all whom it may concern:*

Be it known that I, SEWALL CABOT, a citizen of the United States, and a resident of Brookline, in the county of Norfolk and State of Massachusetts, have invented a new and useful Improvement in Signaling Systems, of which the following is a specification.

My invention relates to the art of transmitting intelligence from one station to another by means of electromagnetic waves, without the use of wires to guide the waves to their destination, and it relates more particularly to a complete system for transmitting and receiving such waves, which may be operated by and in connection with existing wire telegraph lines.

The general object of my invention is to provide a wireless telegraph system which may be operated by and in connection with existing wire telegraph systems without changing any of the operating features of such wire telegraph systems, but maintaining said operating features in their present form as in use today in the present state of development of commercial wire telegraph systems.

Another object of my invention is to provide a wireless telegraph transmitting system which may be operated by a wire telegraph transmitting operator located at a distance from said system; and a wireless telegraph receiving system, located at the same station as said transmitting system or at a different station, which may operate a sounder or other wire telegraph receiving apparatus located at a distance from said receiving system and which may be located at the same wire telegraph station as said transmitting operator.

Other special objects of my invention are to provide wireless telegraph systems which may be operated by and in connection with existing wire telegraph systems, or which may be operated independently of such systems, and by means of which two wireless telegraph messages transmitted simultaneously or otherwise in the same direction by a diplex transmitting system may be automatically relayed in either direction to a diplex receiving system through the intermediary of a two-way diplex wireless telegraph relaying system comprising a diplex receiving system connected by a relatively short wire line to a diplex transmitting system (diplex relayed transmission); by means of which more than two wireless telegraph messages, transmitted simultaneously or otherwise may be similarly relayed (multiple relayed transmission); by means of which a message sent from one station may be relayed to another station, and a message sent from the latter may at the same time be relayed to the former (duplex relayed transmission); by means of which a duplex wireless system, which may be provided with a two-way duplex wireless relaying system, may repeat into a duplex wire line or into two single wires, and, conversely, said duplex wire line or said two single wire lines may operate said duplex wireless system; by means of which a quadruplex wireless system, which may be provided with a quadruplex wireless relaying system may repeat into or be controlled by two duplex wire lines or four single wire lines; by means of which said quadruplex wireless system may repeat into or be controlled by a quadruplex wire line; and in general, to employ wireless telegraphy to supplement existing duplex, diplex, multiplex and quadruplex wire telegraph lines in any and all possible ways, some of which are hereinafter set forth in the present application and others of which are set forth in my application Serial Nos. 305,260, 305,261, and 305,262, filed simultaneously herewith.

Other objects of my invention will hereinafter appear and will be particularly pointed out in the appended claims.

My invention may best be understood by having reference to the drawings which accompany and form part of this specification, and which diagrammatically illustrate organizations of apparatus and circuits whereby the hereinbefore stated objects may be realized.

In the drawings, Figures 1, 5, 6 and 10 are schematic views each representing a signaling system comprising a multiplex wireless telegraph transmitting system and a multiplex wireless telegraph receiving system at a station, a two-way multiplex wireless telegraph relaying system located at a distance from said station, and a multiplex wireless telegraph transmitting system and a multiplex wireless telegraph receiving system at another station located at a distance from said relaying station.

Fig. 1 is a schematic view of a wireless telegraph system which may be operated by and in connection with existing wire telegraph systems, or which may be operated independently of such systems, and by means of which two wireless telegraph messages transmitted simultaneously or otherwise in the same direction by a diplex transmitting system may be automatically relayed in either direction to a diplex receiving system through the intermediary of a two-way diplex wireless telegraph relaying system comprising a diplex receiving system connected by a relatively short wire line to a diplex transmitting system; or by means of which a message sent from one station may be relayed to another station and a message sent from the latter may at the same time be relayed to the former; or by means of which a duplex wireless system, which may be provided with a two-way duplex wireless relaying system, may repeat into two single wire lines and conversely said two single wire lines may operate said duplex wireless system.

Fig. 2 is a diagram showing the circuit arrangements of the diplex or duplex terminal station lettered X in the scheme shown in Fig. 1; Fig. 3 is a diagram showing the circuit arrangements of the two-way diplex or duplex wireless relaying system lettered Y in the scheme shown in Fig. 1; and Fig. 4 is a diagram showing the circuit arrangements of the diplex or duplex terminal station lettered Z in the scheme shown in Fig. 1.

Fig. 5 is a schematic view of a wireless telegraph system which may be operated by and in connection with existing wire telegraph systems, or which may be operated independently of such systems, and by means of which more than two wireless telegraph messages transmitted simultaneously or otherwise in the same or in opposite directions may be relayed in a manner similar to that above specified in connection with Fig. 1.

Fig. 6 is a schematic view of a double duplex wireless system which may be operated by and in connection with existing duplex wire telegraph systems, or which may be operated independently of such systems; by means of which two messages may be transmitted simultaneously or otherwise in one direction and at the same time two messages may be received simultaneously or otherwise from the opposite direction, and which, as shown, is provided with a two-way double-duplex wireless relaying system; and which if operated by and in connection with existing wire telegraph systems may repeat into two duplex wire telegraph lines and may in turn be operated by said duplex wire lines.

Fig. 7 is a diagram showing the circuit arrangements of a duplex wireless telegraph system which may repeat into a duplex wire line and which may be operated by said duplex wire line. Fig. 7 shows in detail the circuit arrangements of one of the two duplex systems shown schematically at X in Fig. 6, the two said duplex systems constituting the aforesaid double-duplex system.

Figure 9:
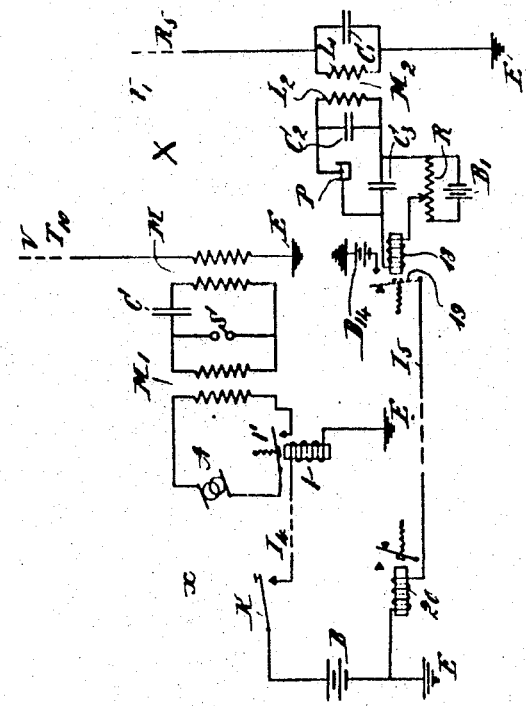
Figure 8:
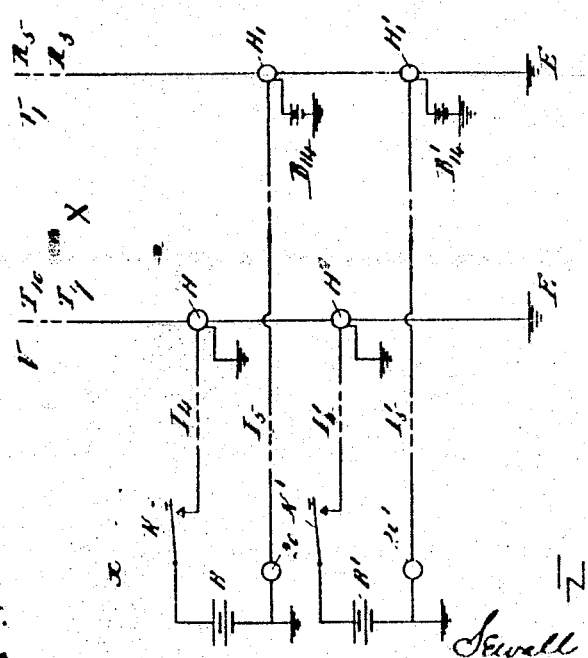
Fig. 8 is a schematic view showing a modification of the system outlined in Fig. 6, in which the double-duplex wireless system repeats into four single wire lines and which in turn may be operated by said four single wire lines.

Fig. 9 is a diagram showing the circuit arrangements of one of the two duplex wireless systems shown schematically in Fig. 8, the two said duplex systems constituting the aforesaid double-duplex system referred to in connection with Fig. 8. Fig. 9 therefore represents a duplex wireless system which may repeat into two single wire lines and which in turn may be operated by said two single wire lines.

Figure 11:
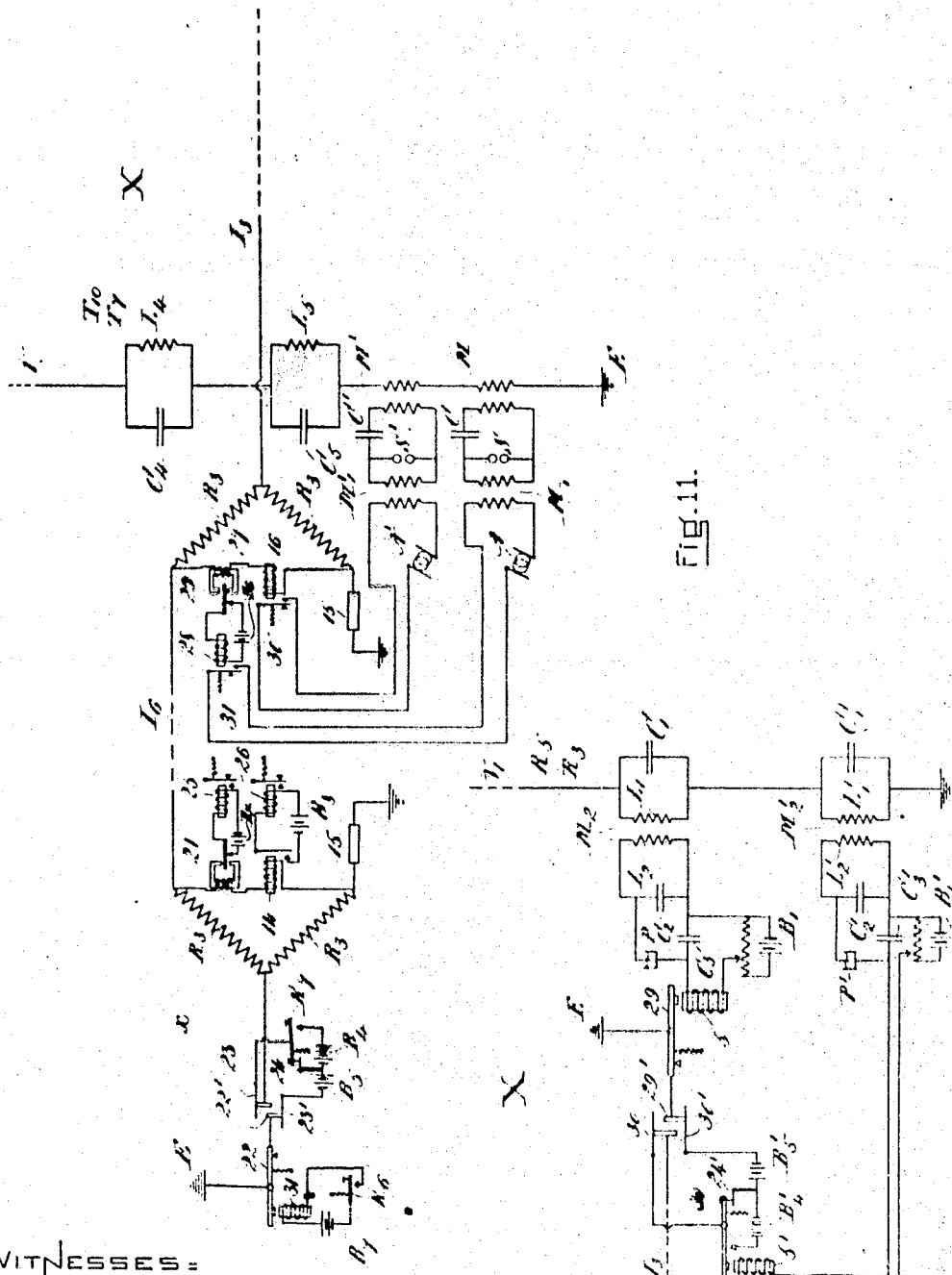
Figure 12:
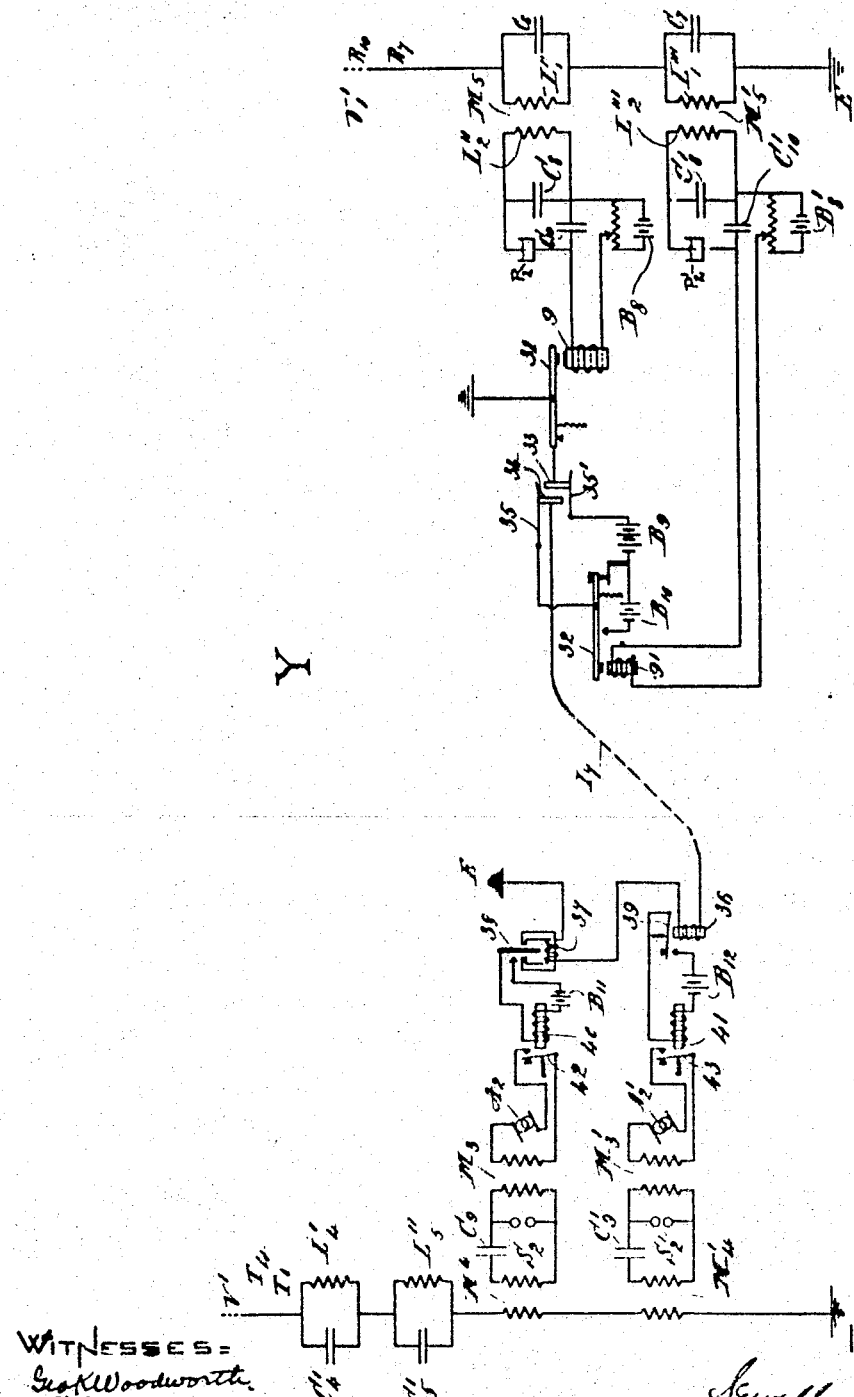

Fig. 10 is a schematic view of a quadruplex or double-duplex wireless telegraph system which may be operated by or in connection with existing quadruplex wire telegraph systems, or which may be operated independently of such systems; which, if operated in connection with such systems, may repeat into or be controlled by a quadruplex wire line; and which as shown is provided with a two-way double duplex or quadruplex wireless relaying system located at a point intermediate of two terminal quadruplex wireless systems; Fig. 11 is a diagram showing the circuit arrangements of the terminal station lettered X in Fig. 10; and Fig. 12 is a diagram showing the circuit arrangements of the wireless relaying system lettered Y in Fig. 10.

In the figures, V represents an elevated transmitting conductor, $V_1$ represents an elevated receiving conductor, E represents an earth connection, M represents a transformer, $L_1$ $L_2$ represent transformer primaries and secondaries, respectively, C represents a condenser, R represents a resistance, B represents a battery, P represents an oscillation detector, K represents a key, S represents a spark gap, A represents an alternating current generator or other suitable source of vibratory current, I represents a wire telegraph line, and II is a symbol employed in the aforesaid schematic views to represent the wireless apparatus and the means associating it with a wire telegraph line and with an elevated conductor; and the various elements represented by the aforesaid reference characters are distinguished from each other according to their positions and functions by providing said reference characters with exponents and subscripts. The various symbols $T_{10}$, $T_7$, etc., placed opposite the several elevated transmitting conductors indicate that electromagnetic signal waves of frequencies represented by the arbitrarily chosen numerals 10, 7, etc., are transmitted by such elevated conductors; and the various symbols $R_{10}$, $R_7$ etc., placed opposite the several elevated receiving conductors indicate in like manner that such receiving conductors are made highly responsive to the aforesaid frequencies.

Figure 1:
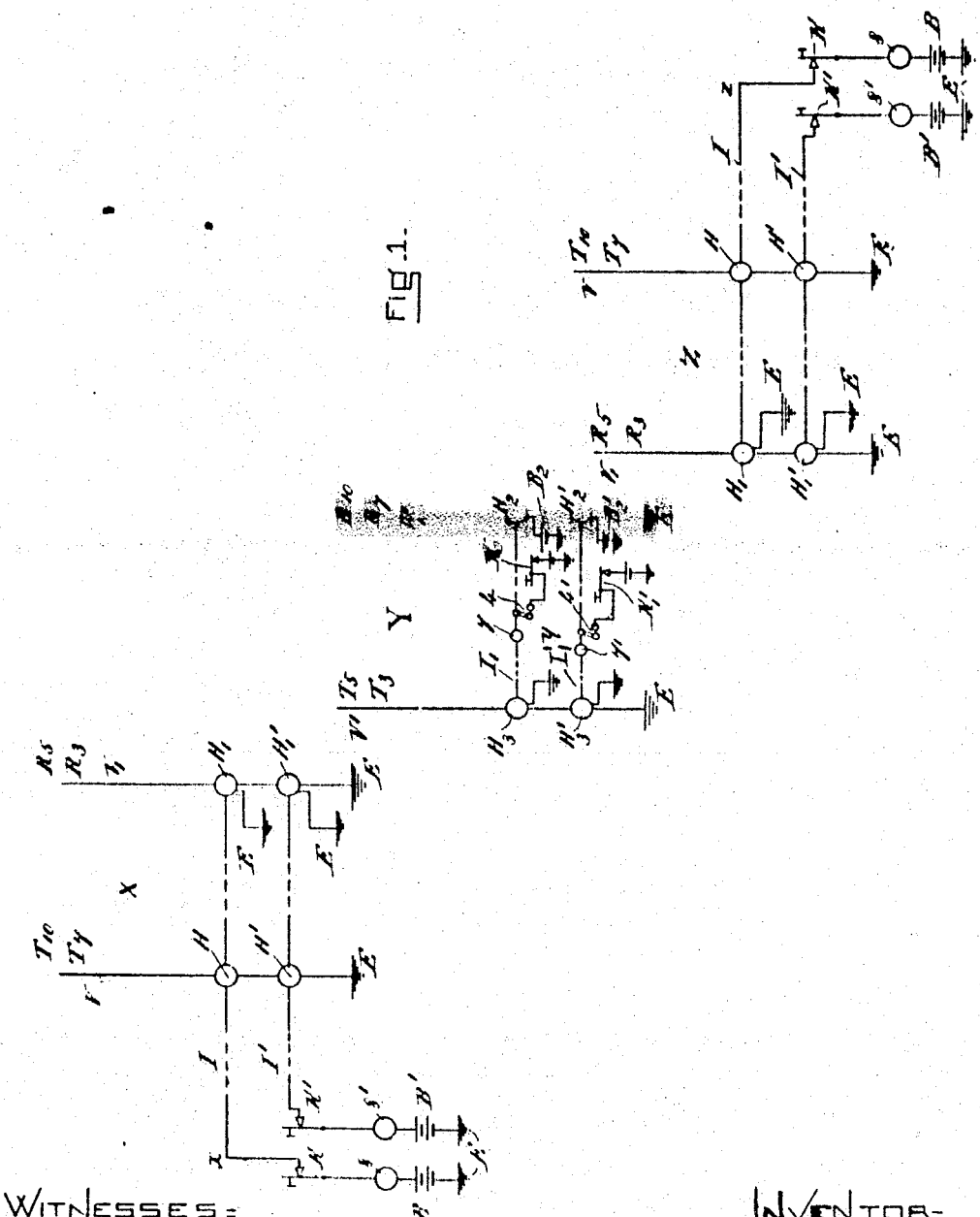

By manipulating the keys K K' at the station lettered $x$ in Fig. 1, two messages may be transmitted simultaneously or otherwise from the terminal wireless station X to the terminal wireless station Z, either with or without the interposition of the relaying system Y, and in like manner two messages may be transmitted from the terminal wireless station lettered Z to the terminal wireless station X by manipulating the keys K K' at station $z$; or one message may be transmitted from station X to station Z by operating the key K at $x$ and at the same time a message may be transmitted from station Z to station X by operating the key K' at $z$, and as in the case of diplex transmission, such duplex transmission may be effected with or without the interposition of the relaying system Y.

I shall describe the system shown in Fig. 1 on the assumption that the relaying system Y is employed. In such case the method employed by me for relaying signals is essentially the same as that described in the patent to Stone No. 717,510, dated Dec. 30, 1902, to which reference may be had.

In Fig. 1, as in all other figures showing the terminal wireless stations X and Z, the conductors I, I', etc. connecting the keys K K' etc. at $x$ and $z$ with said terminal wireless stations may be wire telegraph lines, in which case the points marked $x$ and $z$ represent wire telegraph stations; or, as more fully explained in my application Serial Number 305,260, filed simultaneously herewith, said conductors may be short lengths of wire, and the keys K K' etc. and their associated apparatus in such case are located in the wireless telegraph station houses containing the wireless telegraph transmitting apparatus represented by the symbols H H' etc.

Figure 2:
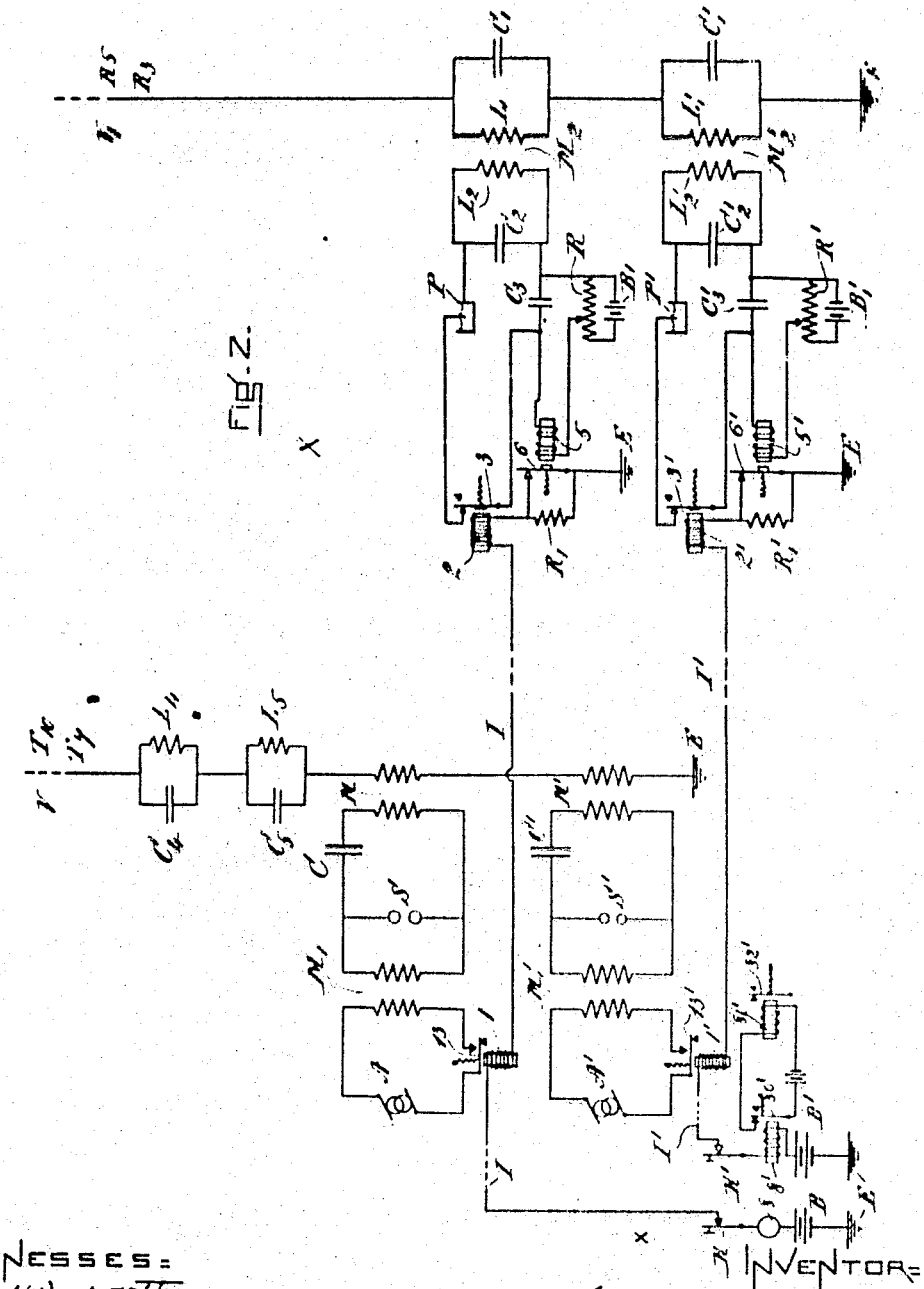

Referring to Fig. 2, which shows in detail one arrangement of apparatus and circuits which may be employed at X and $x$ of Fig. 1, V represents an elevated conductor connected to earth at E through the parallel branch circuits $C_4 L_4$, $C_5 L_5$, and the secondaries of the transformers M M'. The elevated transmitting conductor system V E is so constructed, preferably in the manner described in the patent to Stone, No. 802,426, Oct. 24, 1905, as to be highly responsive to persistent trains of electrical oscillations of two frequencies, represented by the numerals 10 and 7, which are developed therein by the sonorous or persistently oscillating circuits S C M, S' C' M'. The primary power circuits which include the generators A A' and the primaries of the transformers M M', respectively, are normally held open by the armatures 13 13' which are held against their back stops by the magnets 1 1', included in the circuits of the conductors I I' and the batteries B B', respectively.

$V_1$ is an elevated conductor connected to earth at E through the parallel branch circuits $C_1 L_1$, $C_1' L_1'$ and, in the manner more fully described in Patent No. 802,426 aforesaid, the elevated receiving conductor system $V_1$ E is made highly responsive to persistent trains of electrical oscillations of two frequencies, represented by the numerals 5 and 3, developed therein by persistent trains of electromagnetic waves of said frequencies. The resonant receiving circuits $L_1 C_1$, $L_1' C_1'$ are attuned respectively to the aforesaid frequencies represented by the numerals 5 and 3. The oscillation detectors P P', which may be of any suitable type and which herein are shown as consisting of Wollaston anodes immersed in electrolyte, may be associated with said resonant receiving circuits, respectively, in any suitable manner, and as shown they are connected across the terminals of the condensers $C_1$, $C_1'$, respectively. The armatures 3, 3', of the magnets 2, 2', and the front contacts of said armatures, together with the windings of the magnets 5, 5', and the adjustable resistances R R', are included in circuit with the oscillation detectors P P' respectively. The condensers $C_2 C_2'$ may if desired be employed for increasing the capacity of the aforesaid circuits.

The conductors I I' which as shown may be connected to earth at their terminals include respectively the batteries B B', the windings of the relays 8, 8', the keys K K', the windings of the magnets 1, 1', the windings of the magnets 2, 2', the armatures 6, 6' of the magnets 5, 5', and the back contacts of said armatures. Connected across the armatures 6, 6', and their back contacts are the resistances $R_1 R_1'$ and normally, as shown, said resistances are short-circuited by said armatures. The circuit of the conductors I I' and the batteries B B' normally are closed so that the relays 8, 8', and the magnets 1, 2, and 1', 2', normally are energized. The normally energized relays 8, 8', normally energize their associated sounder circuits, as shown in detail in connection with the relay 8', the armature 80' of which normally is held against its front contact thereby closing the circuit of the sounder 81' and thereby causing the hammer 82' to normally rest upon its anvil. It will be understood that the apparatus associated with and controlled by the relay 8 is identical with that shown in detail in connection with the relay 8'.

When either key K or K' is opened, the magnets 8, 8', 1, 1', and 2, 2', respectively, are deënergized. The deënergization of the magnets 8, 8', causes the sounder hammers, one of which is shown at 82', to rise; the deënergization of the magnets 1, 1', causes the energization of the sonorous circuits and the consequent radiation of waves having frequencies represented arbitrarily by "10" and "7"; the deënergization of the magnets 2, 2', which deënergization may occur slightly before the closure of the primary power circuits, results in opening the circuits of the oscillation responsive devices P P', so as to prevent any injury to said devices by excessive currents which may be developed in the circuits of said devices by the waves radiated from the system V E.

The resistances $R_1$ $R_1'$ and the windings of the relays 8, 8', the windings of the magnets 1, 1', and the windings of the magnets 2, 2', are so proportioned that when the magnets 5, 5', are energized by the operation of the detectors P P' and their armatures 6, 6', are attracted thereby cutting the resistances $R_1$ $R_1'$ into circuit, the armatures of the magnets 2, 2', and 1, 1', do not fall back but the relays 8, 8', are deënergized thereby permitting the springs of the associated sounder hammers to raise such hammers to their up stops.

Referring to Fig. 3, which shows in detail one arrangement of apparatus and circuits which may be employed at the relaying station lettered Y in Fig. 1, $V_1'$ represents an elevated receiving conductor connected to earth at E through the parallel branch circuits $C_6$ $L_1''$, $C_7$ $L_1'''$ so that the receiving conductor system $V_1'$ E is made highly responsive to persistent trains of electrical oscillations of two frequencies, represented by the numerals 10 and 7, developed therein by persistent trains of electromagnetic waves of said frequencies. The resonant receiving circuits $L_1''$ $C_6$, $L_1'''$ $C_7'$, are attuned respectively to said frequencies. Associated with said circuits are the detectors $P_2$ $P_2'$ each including in its circuit one of the magnets 9, 9'. The condensers $C_{16}$ $C_{16}'$ perform the same functions as the condensers $C_2$ $C_2'$ already described in connection with Fig. 2.

The elevated transmitting conductor system consisting of the elevated conductor V', the parallel branch circuits $C_4'$ $L_4'$, $C_4''$ $L_4''$, and the secondaries of the transformers $M_4$ $M_4'$, is made highly responsive to persistent trains of electrical oscillations of two frequencies, represented by the numerals 5 and 3, which are developed therein by the sonorous circuits $S_2$ $C_2$ $M_2$, $S_2'$ $C_2'$ $M_2'$, respectively. The primary power circuits including the generators $A_2$ $A_2'$ and the primaries of the transformers $M_2$ $M_2'$, respectively, are normally held open by the armatures 12, 12', which are normally held against their back stops by their springs, the magnets 11, 11' normally being deënergized.

As more fully explained in my application Serial Number 305,262 filed simultaneously herewith, the elevated conductors $V_1'$ V' of the relaying system Y may be located in the outskirts of a city intervening between the terminal stations X and Z, and a way station in said city may be provided as shown at y. The conductors I, $I_1'$ which are wire telegraph lines include the windings of the magnets 11, 11', respectively, and the front contacts of the armatures 10, 10', of the magnets 9, 9'.

The way station apparatus at y consists of the switches 4, 4' which normally are open and by means of which the back contact keys $K_1$ $K_1'$ and their associated batteries $B_2$ $B_2'$ may be connected to the wires I, $I_1'$, and consists further in the relays 7, 7' with their associated sounders, one of which is shown in detail in connection with the relay 7'. The relay 7' being normally deënergized, its armature 70' is normally held against its back contact so that the sounder 71' is normally energized and the sounder hammer 72 is normally held on its anvil.

Figure 4:
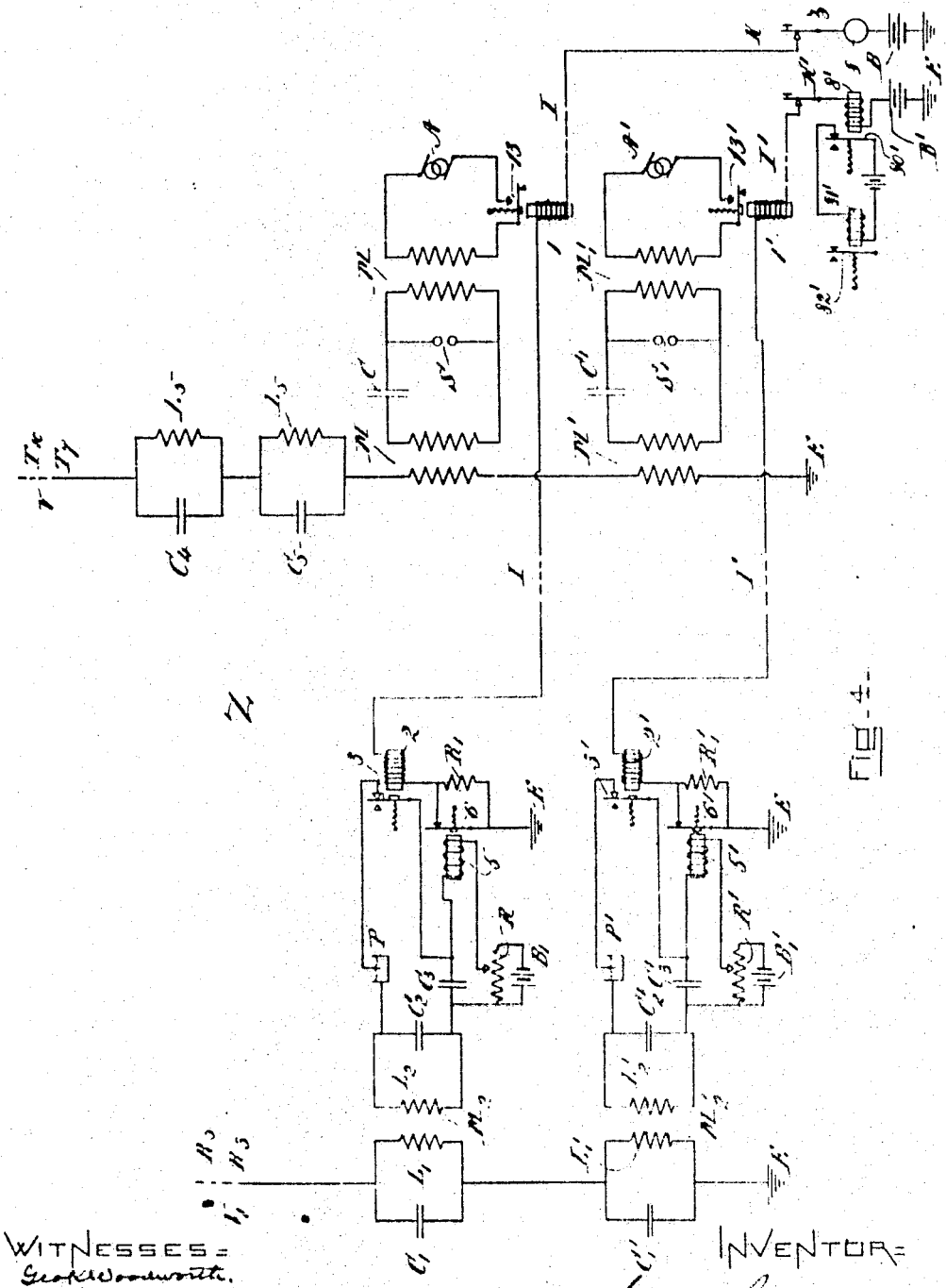

In Fig. 4 which shows in detail one arrangement of apparatus and circuits which may be employed at Z and z of Fig. 1, the elevated transmitting conductor system V E is made highly responsive to persistent trains of electrical oscillations of the aforesaid two frequencies, represented by the numerals 10 and 7, which are developed therein by the sonorous circuits S C M, S' C' M'; and the elevated receiving conductor system $V_1$ E is made highly responsive to persistent trains of electrical oscillations of the aforesaid two frequencies, represented by the numerals 5 and 3, developed therein by persistent trains of electromagnetic waves of said frequencies. It will be noted that the apparatus at the terminal station Z is identical with that above described at the terminal station X and that the apparatus at the point or station z, which may be a wire telegraph station, or which may be located in the same station house as that in which the transmitting apparatus shown in Fig. 4 is located, is identical with the apparatus at the point or station x.

The operation is as follows, reference being had to Fig. 1 for the general description and to Figs. 2, 3 and 4 for the detailed description: If it is desired to send a message from X to Z, either key K or K' is opened, and assuming that the key K' is opened, electromagnetic signal waves of frequency "7" are radiated as back-stroke-Morse wireless signals from the transmitting conductor V. These waves are received by the receiving conductor $V'_1$ at the relaying station Y and are converted into front-stroke-Morse wire signals at the way station y, and said signals are converted into back-stroke-Morse wireless signals by the apparatus $H_1'$, said wireless signals being transmitted from the transmitting conductor V' by waves of frequency "3". The back-stroke-Morse wireless signals transmitted by waves of said frequency "3" are received at Z by the receiving conductor $V_1$ and, by means of the apparatus $H_1'$ at Z, are converted into front-stroke-Morse wire signals in the line I' and operate relay 8'. Similarly if the key K at x is operated, front-stroke-Morse wire signals are transmitted along the conductor I, are converted by the apparatus H into back-stroke-Morse wireless signals radiated by waves of frequency "10", said waves are received at Y by the conductor $V'_1$, are converted into front-stroke-Morse wire signals at y, and effect the radiation of back-stroke-Morse wireless signals from the conductor V', said wireless signals being transmitted by waves of frequency "5". Said waves are received at Z by the receiving conductor $V_1$, are converted by the apparatus $H_1$ at Z into front-stroke-Morse wire signals in the conductor I and cause the operation of the relay 8 and its associated apparatus.

It will be understood of course that the relaying system Y is employed only when the distance separating the terminal stations X and Y is too great to be bridged by direct wireless transmission. The station X may be situated, for example, on the outskirts of New York city, the transmitting and receiving systems of the relaying system Y may be situated on opposite sides of the city of New Haven, and the terminal station Z may be situated on the outskirts of Boston. The wire telegraph stations x and z may be located at long distances from their respective wireless stations, being connected therewith by the wire telegraph lines I, I', or they may be located in the same station house as the transmitting apparatus of said wireless stations X and Z, the lines I, I' being in such case short conductors. The advantage of employing said conductors I, I' connecting the keys K K' with the transmitting apparatus H H' has been more fully explained in my application Serial Number 305,260, filed simultaneously herewith and is, that thereby back-stroke-Morse wireless signals and front-stroke-Morse wire signals may be mutually interconverted. In order to take care of the traffic from stations X and Z to the city on the outskirts of which the wireless transmitting and receiving systems of the relaying system Y are located, the way station y is provided in said city and the way station apparatus is connected with the wireless transmitting and receiving systems of the relaying system by the conductors I, $I_1'$. When the way station operator hears the call for his station, he connects his key $K_1$ or $K_1'$ with the line $I_1$ or $I_1'$ by throwing the switch 4 or 4' and proceeds to communicate with the station X or Z or x or z, which has called him, in the usual way. It will be obvious that either one of any pair of operators can "break" the other in the same manner as in wire telegraphy, namely by the simple expedient of opening his key.

From the foregoing it will be seen that both the keys K K' may be operated at the same time at either station x or the station z, and that the two keys $K_1$ and $K_1'$ at the station y also may be operated simultaneously. Also it will be seen that the key K at station x may be operated at the same time that the key K' at station z is operated, or that duplex transmission may take place between x and y or between z and y.

The particular operations effected in order to accomplish the methods of signaling above described in connection with the complete transmission system shown schematically in Fig. 1 may be understood by having reference to Figs. 2, 3 and 4. These operations will be explained in connection with the operation of key K' at station x and key $K_1'$ at station y, it being understood that the explanation applies also to the operation of the several other keys. When the key K' is opened the normally energized magnets 8', 1' and 2' are de-energized, the sounder hammer 82' rises, the armature 13' closes the power circuit including the generator A' and a train of waves of frequency "7" is radiated, and the armature 3' opens the circuit of the detector P'. Said waves of frequency "7", create oscillations in the receiving conductor $V_1'$ at Y and these oscillations are selectively received by the resonant receiving circuit $L_1'''$ $C_2'$ and operate the detector $P_2'$. The operation of said detector energizes the wireless telegraph relay 9', which relay may be any suitably constructed apparatus although it is represented merely conventionally in Fig. 3. The energization of said relay 9' closes the circuit of the conductor $I_1'$ through the battery $B_1'$ and thereby effects the energization of the magnets 7' and 11'. The energization of the magnet 7' opens the circuit of the sounder 71' and causes the sounder hammer 72' to rise. The energization of the magnet 11' closes the circuit of the generator $A_1'$ and effects thereby the radiation of waves of frequency "3" from the transmitting conductor V'. Said waves of frequency 3 create oscillations of corresponding frequency in the conductor $V_1$ at Z (see Fig. 4) and said oscillations are selectively received by the resonant receiving circuit $L_4'$ $C_3'$ thereby causing the detector P' to energize the magnet 5'. The energization of the magnet 5' and the consequent attraction of its armature 6' cuts the resistance $R_1'$ into the circuit of the conductor I' and battery B' thereby reducing the current in said circuit to such a degree that the armature 80' of the relay 8' falls back and opens the circuit of the sounder 81' thereby causing the sounder hammer 82' to rise. The current, however, in the circuit of the conductor I' and battery B' is not sufficiently reduced to permit the armatures 3' and 13' to fall back and thereby open the circuit of the detector P' and close the circuit of the generator A', respectively. The operator at the key K' is now ready to send his message, and his own sounder 81', as well as the sounder 71' at the way station y and the sounder 81' at the terminal station z are all deënergized and therefore in condition to respond to the movements of his key K'. In this connection it is to be noted that the particular arrangement of front and back contact keys and relays, as well as the apparatus for converting front-stroke wire into back-stroke wireless and vice versa is such that all the sounders associated with the system shown in Fig. 1 follow synchronously the movements of the signaling keys, as in the case of straightout wire signaling.

The operator at key K' at x, having opened his key and having thereby placed all sounders to be affected by the movements of his key in condition to respond to such movements, now closes his key, said closure being the beginning of a signal element, and then opens it again, said opening being the completion of a signal element; and in view of the foregoing it will be seen that his own sounder hammer 82' as well as the sounder hammers 72' at y and 82' at z strike their anvils when the key K' is closed and rise therefrom to their up stops when the key K' is opened. It will of course be understood that the length of time during which the key K' remains closed determines the character of the signal. It will be seen that when the key K' at station X is closed and the several sounder hammers are in contact with their respective anvils, the circuit of the generator A' is opened, the radiation of waves from V ceases, the magnet 2' is energized, the circuit of the detector P' is closed, the excitation of the responder P₁' at Y ceases, the armature 10' falls back, the relay 7' is deënergized, the magnet 11' is deënergized, the circuit of the generator A₁' is opened, the radiation of waves of frequency "3" from V' ceases, the return to normal condition of detector P' at Z causes the deënergization of magnet 5', the relay 6' is retracted and thereby short-circuits the resistance R₁' and the relay 8' at station z is energized, thereby bringing the sounder hammer 82' down on its anvil.

The subsequent opening of the key K' at station X to complete the signal element, effects the same operations as the aforesaid opening of said key at the beginning of transmission which as above stated puts the several sounders in condition to follow the subsequent movements of said key.

When the operator at key K₁' at the way station y hears his sounder 72' spell out the call of his station, he connects his back contact key K₁' to the conductor I₁' by throwing his switch 4' and then by the operation of his own key, his sounder, as well as those at x and y follow synchronously the movements of said key. By his key he transmits front-stroke-Morse wire signals which are converted into back-stroke-Morse wireless signals radiated by waves of frequency "3" from the vertical V' and said waves are selectively received at X and Z and cause the operation of the sounders 82' at x and z.

The operation of "breaking" is effected as above stated by an operator at x, y or z simply opening his key. For example, if the operator at the key K' at z fails to understand a signal sent to him by the operator at key K' at x or by the operator at key K₁' at y, said operator at z opens his key K' thereby deënergizing the magnets 1' and 2' and consequently sending a "break" signal by radiating waves of frequency "7" from the elevated conductor V at Z, and at the same time opening the circuit of the detector P' at Z. Said "break" signal waves are received by the operator at the key K₁' at y when his back contact key K₁' is open, i. e., when his battery B₂' is disconnected from his line I₁', and they are received by the operator at key K' at x when said operator's key is closed, i. e., when said key is in its normal position as shown in Fig. 2, and the sounder hammer 82' rests upon its anvil. In other words each of the operators at y or x receives the "break" signal from z while sending his own signal elements.

It is not absolutely necessary to employ the magnets 2, 2' and their armatures 3, 3' to open the circuits of the detectors P P' at stations X and Z during transmission, for by appropriately choosing the frequencies of the oscillations developed by the sonorous circuits associated with the elevated transmitting conductor systems V E and the frequencies of the oscillations to which the resonant receiving circuits associated with the elevated receiving conductor systems V₁ E are attuned, and by sufficiently separating V₁ E from V E, the transmission of waves of the frequencies represented by the numerals 10 and 7 will not effect the response of the detectors P P' each of which is associated with a resonant receiving circuit selective to the frequencies represented by the numerals 5 and 3, respectively. Furthermore even if said magnets 2, 2' are employed, it will be noted that when key K is opened and waves of frequency "10" are transmitted, the circuit of responder P' is not opened and said responder P' is not protected from any currents which may be developed in its circuit by said waves. It is desirable, therefore, in order to prevent the operation of detector P' and the resulting operation of relay 8' by waves of frequency "10" transmitted from the elevated conductor V when the key K is opened, to make the frequencies "10" and "3" as different as is necessary for such purpose; and in like manner it is desirable to make the frequencies "7" and "5" as different as is necessary in order to prevent the operation of the responder P and the resulting operation of relay 8 by waves of frequency "7" transmitted from the elevated conductor V when the key K' is opened.

Figure 5:
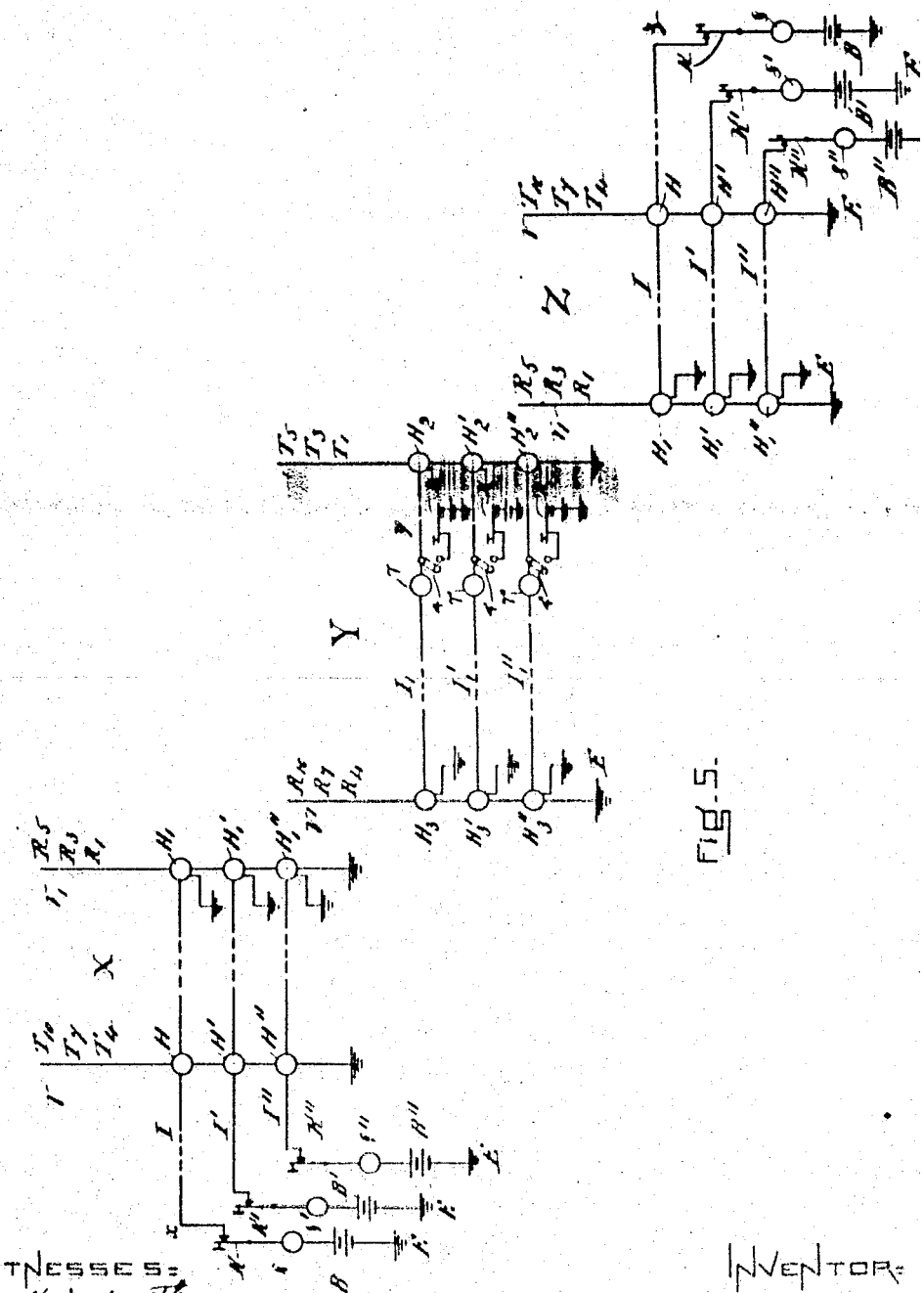

An extension of the system outlined in Fig. 1 whereby more than two, namely three, wireless telegraph messages may be transmitted in accordance with the principles above outlined, is shown schematically in Fig. 5. The operation of the system shown in Fig. 5 will be understood in view of the foregoing detailed description of Fig. 1. Suffice it to say in regard to Fig. 5 that the keys K, K', K" at $x$ may simultaneously or otherwise be operated to cause the radiation from the elevated conductor V of waves of frequencies "10," "7", and "4", which are received by the elevated conductor V' at Y and by means of the apparatus represented by $H, H_1' H_1''$, the lines $I, I_1' I_1''$, and the apparatus represented by $H, H' H_1''$, they are converted into waves of frequencies "5", "3", "1", which later waves are received by the receiving conductor $V_1$ at Z and effect the operation of the relays 8, 8', 8". As in the system above described in connection with Fig. 1, the way station operators at $y$ may put themselves into communication with the terminal station operators at $x$ and $z$, and vice versa, and any operator may "break" the operator transmitting to him. In lieu of sending three messages from $x$ to $z$ and vice versa, two messages may be sent from $x$ by two keys, say K and K', to operate the sounders 8, 8' at $z$ at the same time that a message is being sent from $z$ to $x$ by the key K" at $z$ to operate the relay 8" at $x$ and vice versa. Furthermore it will be understood that the relaying system Y is employed only when the distance separating X and Z is too great to be bridged by direct wireless transmission. In case said relaying system is not employed, it will of course be understood that the receiving system of station Z will be made selective to frequencies "10", "7" and "4", and that the transmitting system at station Z will radiate waves of frequencies "5", "3" and "1".

Figure 6:
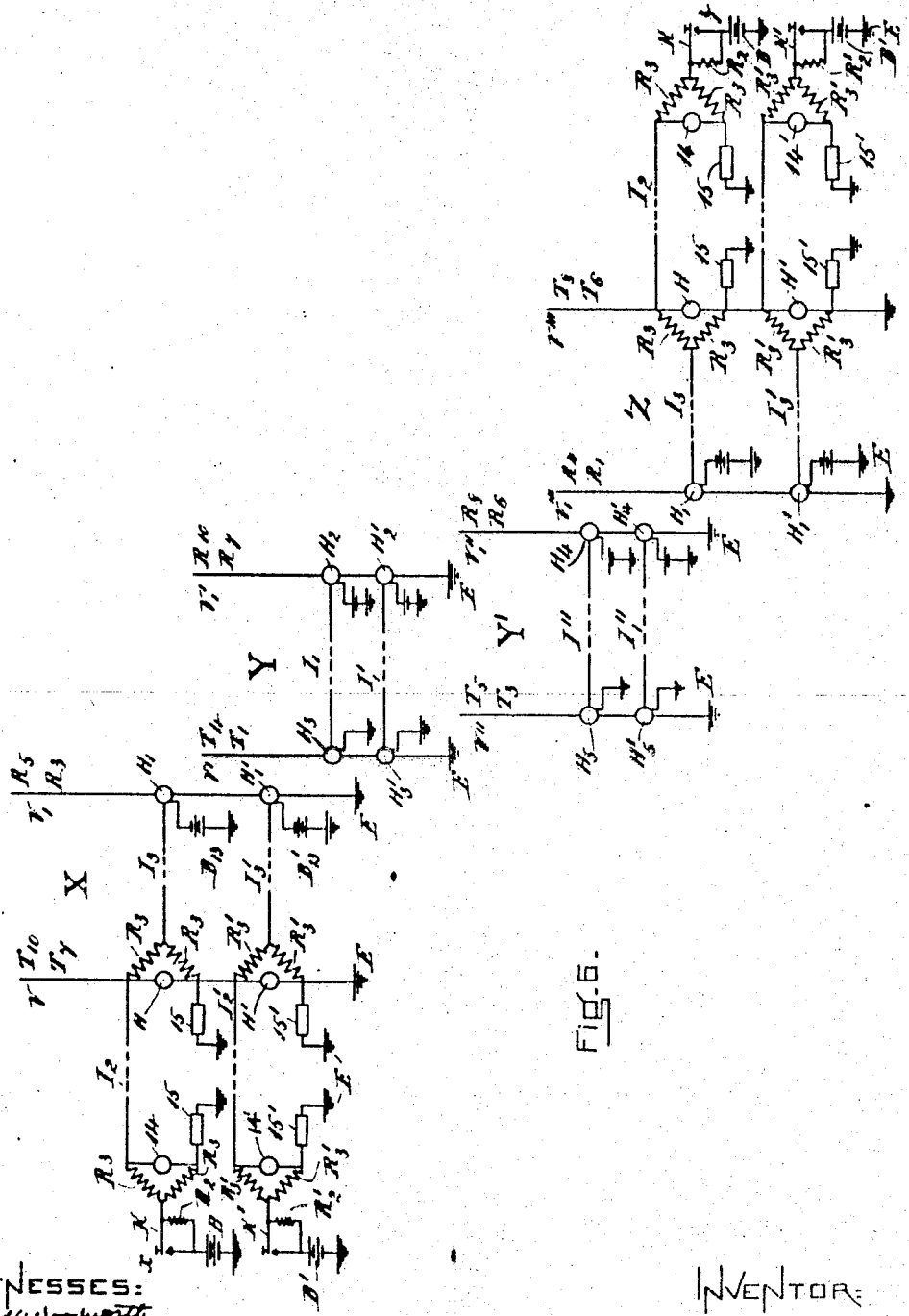

The system outlined in Fig. 6 represents an extension of the system shown in Fig. 1 and by it a double duplex or quadruplex wireless system may be operatively associated with two existing duplex wire telegraph systems so that it may be operated by said wire systems and in turn may operate said systems; or which may be operated independently of said wire systems; and by means of which two messages may be transmitted simultaneously or otherwise in one direction, as from X to Z, at the same time that two messages are being received simultaneously or otherwise from the opposite direction as from Z to X. In conjunction with the terminal stations X and Z, the two-way double-duplex wireless relaying system Y Y' may be employed. In Fig. 6 the symbols H H, etc. represent the wireless telegraph transmitting and receiving circuits and the means whereby such circuits are associated with the elevated transmitting and receiving conductors.

The details of the circuit arrangements of one of the duplex systems indicated in Fig. 6 are shown in Fig. 7, and it will be understood that the other of the two duplex systems making up the double-duplex system is identical with that shown in Fig. 7.

In Fig. 7 the line $I_2$ may be an existing duplex wire telegraph line or it may be, as above explained in connection with the conductors I I' of Fig. 1, merely a short conductor which does not extend outside the station house which includes the wireless transmitting apparatus of station X and the key K. The receiving relay 14 and the transmitting relay 16 are bridged across two equipotential points in the duplex system $I_2$ in the usual manner. The key K with its shunting resistance $R_3$ as well as the armature 19 of the relay 18 with its shunting resistance $R_4$ constitute continuity-preserving keys, and for them may be substituted any of the more usual transmitting devices of the character commonly employed in duplex wire telegraphy. The resistances $R_1 R_2$ at each terminal of the duplex system are the bridge elements commonly employed in duplex telegraphy, and 15, 15 are the artificial lines whereby the two sides of the duplex system are balanced. It will now be understood that the closure of the normally open key K short-circuits the resistance $R_3$ thereby increasing the current through the relay 16 and causing the armature 17 of said relay to close the circuit of the generator A through the primary of the transformer M, and energizing the sonorous circuit S C M. The closure of the K however does not operate the receiving relay 14. When waves of the frequency to which the resonant receiving circuit $L_2 C_2$ is attuned impinge upon the receiving conductor $V_1$, the operation of the detector P causes the energization of the relay 18 and the attraction of the armature 19 thereof, thereby short-circuiting the resistance $R_4$ and increasing thereby the current through the receiving relay 14 sufficiently to operate the same. The closure of the armature 19 on its front contact, however, does not operate the relay 16. It will be understood that the duplex wireless system shown in Fig. 7 may be operated in conjunction with another system at a distant station which is identical with it or, as shown in Fig. 6, that two such duplex systems may be combined at a station, such as X and Z, thus constituting a double-duplex or quadruplex system and that the relaying system Y Y' may be interposed between said stations X and Z. In view of the foregoing description of Figs. 1, 2, 3 and 4 and Fig. 7, the operation of the system shown in Fig. 6 will be apparent. Assuming that the system is operated to its full capacity, the operators at keys K K' at $x$ manipulate their keys and radiate signal waves of frequencies "10" and "7", respectively; these waves come into the receiving side of the relaying system Y and are converted into wireless signals radiated by waves of frequencies "4" and "1"; the latter waves are received selectively by the receiving conductor $V_1'''$ and its associated apparatus, represented by $H_1$ and $H_1'$ at Z, and are translated into wire signals at the relays 14 and 14'. At the same time that the operators at $x$ are sending their signals the two operators at $z$ by manipulating their keys cause the elevated conductor $V'''$ to radiate waves of frequencies "8" and "6", which waves come into the receiving side of the relaying system Y' and by the apparatus indicated at $H_4$ $H_4'$ and the apparatus indicated at $H_4$ $H_4'$ are converted into wireless signals of frequencies "5" and "3"; said waves are selectively received by the receiving conductor $V_1$ and its associated apparatus at X and are reproduced as wire signals at the relays 14, 14'.

The circuit arrangements of the two-way double duplex wireless relaying system Y Y' are identical with those shown in detail in Fig. 3, and it will be understood of course that each line I, I" &c. at Y Y' may be provided with the way station apparatus shown at $y$ in Fig. 3.

It will be obvious that eight operators are required for working the quadruplex system shown in Fig. 6 to its full capacity and that the method of signaling, "breaking", repeating, &c., is identical with that now employed in quadruplex wire transmission.

In Fig. 8, I have substituted, in a manner that will be obvious, four single wire lines for the two duplex lines shown in Fig. 6. In Fig. 8 the operation of the key K connected with the transmitting system at X by the single wire line $I_4$ causes the radiation of waves of frequency "10"; and the operation of key K' causes the radiation of waves of frequency "7". The reception of waves of frequencies "5" and "3", respectively, causes the operation of the receiving relays 20 and 20'. It will be understood that when the system shown in Fig. 8 is substituted for the system shown at the terminal stations X and Z of Fig. 6, the two-way double-duplex or quadruplex wireless relaying system Y Y' if employed will be the same in structure as those shown in Fig. 6.

Fig. 9 shows the circuit arrangements of one of the duplex wireless systems shown in Fig. 8, and it will be understood of course, as explained above in connection with Fig. 7, that the system shown in Fig. 9 may be operated in conjunction with an identical system at a distant station, either with or without the interposition of a relaying system such as shown at Y in Fig. 1 and Fig. 3. In other words the system shown in Fig. 9 may be substituted for the terminal station systems X and Z of Fig. 1. It will be noted, however, that while Fig. 1 shows a system which is diplex as well as duplex, Fig. 9 shows a system which is duplex only.

Referring to Fig. 9 the operation of the key K energizes the relay 1 and closes the circuit of the generator A thereby causing the radiation of waves of frequency "10"; while the reception by the conductor $V_1$ of waves having the frequency to which the resonant receiving circuit $L_1$ $C_1$ is attuned causes the operation of the responder P, the energization of the relay 18 and finally the operation of the receiving relay 20.

In Fig. 10 I have outlined the principle of a quadruplex wireless telegraph system which may be operated by and in connection with an existing quadruplex system, and which may be provided with a quadruplex wireless telegraph relaying system Y Y' interposed between the terminal stations X and Z. The system in Fig. 10 will at once be seen to be an extension of the system shown in Fig. 6, in which the quadruplex wireless system is operatively associated with two duplex wire systems and an extension of the system shown in Fig. 8 in which the quadruplex wireless system is operatively associated with four single wire lines. As in the system represented by Fig. 6, eight operators are required if the system shown in Fig. 10 is to be loaded to its full capacity. By the system shown in Fig. 10, two messages may be transmitted from $x$ to $z$ by two operators, one at each of the keys $K_6$ $K_7$, at $x$ and said messages will be taken by two operators at the receiving relays 21 and 14 at $z$; and simultaneously with the transmission of the aforesaid two messages from $x$ to $z$, two other messages may be transmitted from $z$ to $x$ by two operators, one at each of the keys $K_6$ $K_7$, at $z$ and these messages will be taken by two operators at the receiving relays 21 and 14 at $x$.

As specified above in connection with Fig. 6, the quadruplex relaying system Y Y' may be interposed between the terminal stations X and Z. The particular type of relaying system indicated at Y Y' on Fig. 10 and one section of which, namely Y, is shown in detail in Fig. 12, may of course, as will readily be apparent, be substituted for the particular type of relaying system shown in Fig. 6, and vice versa.

By the operation of the key $K_6$ at $x$ in Fig. 10, the pole-changing key 22 reverses the polarity of the quadruplex system $I_4$ and causes the apparatus $II_4$ to operate a polar relay hereinafter described, thereby effecting the radiation of waves of frequency "10". By the operation of the strength-changing or Stearns key $K_7$ a Morse relay hereinafter described causes the operation of the apparatus indicated by $H_7$ and thereby effects the radiation of waves of frequency "7". The said waves of frequency "10" come into the receiving side of the relaying system Y and by the apparatus designated as $H'_6$ effect the operation of a pole-changing key, thereby reversing the polarity of the diplex line $I_7$ and causing a polar relay to operate the apparatus indicated as $H'_6$. The operation of said apparatus causes the radiation of waves of frequency "4" from the transmitting side of the relay Y and said waves are received by the elevated receiving conductor system $V_1'''$ at Z, thereby causing the apparatus indicated at $H_8$ to operate a pole-changing key and reverse the polarity of the quadruplex system $I_6$. Said reversal of polarity operates the receiving polar relay 21.

The aforesaid waves of frequency "7" come into the receiving side of the relaying system Y and by the apparatus designated as $H_7'$ effect the operation of a Stearns key thereby varying the strength of the current of the diplex line $I_7$ and causing a Morse relay to operate the apparatus indicated as $H'_7$. The operation of said apparatus causes the radiation of waves of frequency "1" from the transmitting side of the relay Y and said waves are received by the elevated receiving conductor system $V'''_1$ at Z, thereby causing the apparatus indicated at $H_8$ to operate a Stearns key and vary the strength of the current in the quadruplex system $I_6$. Said variation of current operates the receiving Morse relay 14. At the same time that the operations above set forth are taking place, the operation of the keys $K_6$, $K_7$ at $z$ may cause the radiation, respectively, of waves of frequencies "8" and "6" from $V''''$, and said waves will be received by the vertical $V_1''$ and relayed to X as waves of frequencies "5" and "3", respectively. Said waves of frequencies "5" and "3" will be received by the elevated receiving conductor system $V_1$ at X and by the apparatus $H_3$, $H_5$ cause the energization of the polar relay 21 and the Morse relay 14 at $x$.

The circuit arrangements for the terminal station X are shown in detail in Fig. 11, and it will be understood that the apparatus at the terminal station Z is identical with that at station X except that the frequencies transmitted and received by station Z are different from those transmitted and received by station X, as above set forth.

In Fig. 11, $I_6$ represents a bridge quadruplex although of course it will be understood that any other kind of quadruplex, such as the differential, may be employed. Inasmuch as my invention does not consist in the quadruplex per se or in the duplex per se, but consists in part of the means and circuit arrangements whereby a wireless system may be operated by existing multiplex wire systems, I have adopted the particular form of quad shown in Fig. 11, as well as the particular form of duplex shown in Fig. 7 merely as illustrative of the principles of my invention. In this connection it is of course to be understood that the various devices now employed in quadruplex systems for tiding over the moments of "no magnetism" in the Morse relays due to distant end reversals of polarity by the pole-changing keys are to be employed with the quadruplex system shown in Fig. 11, although for the purposes of simplifying the drawings such devices are not shown.

In the aforesaid bridge quadruplex system $I_6$, $R_2$ $R_3$ are the bridge resistances and between their outer terminals at the station $x$ is connected a branch serially including the polar relay 21 and the Morse relay 14, which control respectively the sounders 25 and 26. At the wireless end of the aforesaid quadruplex a branch is connected across the outer terminals of the bridge resistances and includes the polar relay 27 and Morse relay 16. As indicated the polar relay may operate the relay 28 which when energized closes the circuit of the generator A and thereby effects the radiation of waves of frequency "10". The Morse relay 16 when energized causes its armature 30 to close the circuit of the generator A' and thereby effects the radiation of waves of frequency "7".

The branch which includes the relays 21 and 14 being connected between points of zero difference of potential for currents from the batteries $B_4$ $B_5$, said relays are not affected by the operation of the keys $K_6$ $K_7$.

The closure of the key $K_6$ energizes the magnet 31 and thereby causes the pole-changer 22 to break contact with the spring 23' and make contact with spring 23, raising said spring 23 from its coöperating contact and permitting spring 23' to strike said coöperating contact. These operations reverse the connections of the battery $B_5$, or the batteries $B_5$ and $B_4$, with the line and earth E. The normal position of the key $K_7$ as shown connects the battery $B_5$ to the system and when said key is depressed both batteries $B_5$ and $B_4$ are connected to the system. The line wire $I_3$ connects the outer end of the quadruplex to the apparatus whereby the wireless receiving system at X is associated with the wire system, as indicated in Fig. 11 by showing the ends of $I_3$ in dotted lines. Referring now to the wireless receiving system at X, signal waves of frequencies "5" and "3" operate respectively the detectors P and P' associated with resonant receiving circuits attuned respectively to said frequencies. The operation of detector P' causes the energization of magnet 5 which in turn operates the pole-changing key 29 and thereby reverses the polarity of the wire system. Such reversal of polarity operates the polar relay 21 at x and its associated sounder 25. The operation of the detector P' causes the energization of the magnet 5' and this in turn operates the Stearns key 30, thereby varying the current in the wire system and operating the Morse relay at 14 at x and its associated sounder 26. The operation of the keys 29 and 30 does not affect the relays 27 and 16 because they are bridged across the quadruplex system between two points having zero potential for currents from the batteries $B_4'$ $B_5'$.

The details of one portion of the quadruplex wireless relaying system shown in Fig. 10, namely that portion designated by Y therein, are shown in Fig. 12, and it will be understood that that portion of said relaying system designated by Y' in Fig. 10 is identical in its circuit arrangements with the portion Y, except that the transmitting and receiving systems of Y' are not attuned to the same frequencies as the transmitting and receiving systems of Y. In Fig. 12 the waves of frequencies "10" and "7" radiated as above set forth from the transmitting system at the terminal station X, operate the receivers $P_2$ $P_2'$. The operation of the detector $P_2$, which is associated with the resonant receiving circuit $L_2''$ $C_2$ attuned to the frequency "10", energizes the magnet 9 and thereby operates the pole-changing key 31, the contact-maker 33 of which coöperates with the springs 35, 35' which in turn coöperate with the stop 34. The resulting reversal of polarity operates the polar relay 37 causing its armature 38 to close the circuit of the relay 40 and thereby causes the armature 42 of the latter to close the circuit of the generator $A_4$ and effect the radiation of waves of frequency "4". The operation of the pole-changer 31 does not cause the operation of the Morse relay 36. The operation of the detector $P_2'$ associated with the resonant receiving circuit $L_2'''$ $C_2'$ which is attuned to frequency "7", causes the energization of the magnet 9' which in turn operates the Stearns key 32. The resulting variation of the current in the line $I_7$ operates the Morse relay 36 and causes the armature 39 thereof to close the circuit of the relay 41, thereby closing the circuit of the generator $A_2'$ which normally is held open by the armature 43, and effecting the radiation of waves of frequency "1".

The waves of frequencies "4" and "1" radiated from the elevated transmitting conductor V' at Y as aforesaid, are received by the elevated receiving conductor $V_1'''$ at Z and cause the operation of the receiving relays 21 and 14, respectively. The arrangement of apparatus and circuits at the terminal station Z is identical with that at the terminal station X except, as indicated, the terminal station Z transmits, and is responsive to, signal waves of frequencies "8", "6" and "4", "1", respectively.

It will be apparent that the diplex lines $1_7$ and $1_7'$ at Y and Y' may each be provided with a way station having diplex transmitting and receiving apparatus; and that the operation of "breaking" will be the same as that now commonly employed in existing quadruplex wire systems.

I do not wish to be limited to the exact form of apparatus or circuit arrangements which I have herein shown and described for the purpose of more fully disclosing my invention, inasmuch as said apparatus and circuit arrangements are capable of a wide range of variation without departing from the spirit of my invention.

I claim,

1. In a signaling system, a multiplex wireless telegraph system and a multiplex wire telegraph system operatively associated therewith.

2. In a signaling system, a diplex wireless telegraph system and a diplex wire telegraph system operatively associated therewith.

3. In a signaling system, a duplex wireless telegraph system and a duplex wire telegraph system operatively associated therewith.

4. In a signaling system, a duplex wireless telegraph system and two single-wire telegraph systems operatively associated therewith.

5. In a signaling system, a quadruplex wireless telegraph system and two duplex wire telegraph systems operatively associated therewith.

6. In a signaling system, a quadruplex wireless telegraph system and four single-wire wire telegraph systems operatively associated therewith.

7. In a signaling system, a quadruplex wireless telegraph system and a quadruplex wire telegraph system operatively associated therewith.

8. In a signaling system, a multiplex wire telegraph system, a multiplex wireless telegraph system operatively associated therewith, a two-way multiplex wireless telegraph relaying system located at a distance from said wireless telegraph system, another multiplex wireless telegraph system located at a distance from said relaying system, and a multiplex wire telegraph system operatively associated with the last mentioned multiplex wireless telegraph system.

9. In a signaling system, a quadruplex wireless telegraph system, a quadruplex wire telegraph system operatively associated therewith, a quadruplex wireless telegraph relaying system located at a distance from said wireless telegraph system, another quadruplex wireless telegraph system located at a distance from said relaying system and a quadruplex wire telegraph system operatively associated with the last mentioned quadruplex wireless telegraph system.

10. In a signaling system, a multiplex wireless telegraph transmitting system and a multiplex wireless telegraph receiving system at a station, a multiplex wire telegraph system operatively associated with said wireless telegraph systems, a two-way multiplex wireless telegraph relaying system located at a distance from said station, a multiplex wireless telegraph transmitting system and a multiplex wireless telegraph receiving system at another station located at a distance from said relaying system, and a multiplex wire telegraph system operatively associated with said last mentioned wireless telegraph systems.

11. In a signaling system, two terminal stations each comprising a multiplex wireless telegraph transmitting and receiving system, multiplex wire telegraph systems associated respectively with the wireless telegraph systems at said terminal stations, and an intermediately located two-way multiplex wireless telegraph relaying system.

12. In a signaling system, two terminal stations each comprising a diplex wireless telegraph transmitting and receiving system, diplex wire telegraph systems operatively associated respectively with said wireless telegraph systems, and an intermediately located two-way diplex wireless telegraph relaying system.

13. In a signaling system, two terminal stations, each comprising a duplex wireless telegraph transmitting and receiving system, duplex wire telegraph systems operatively associated respectively with said wireless telegraph systems, and an intermediately located duplex wireless telegraph relaying system.

14. In a signaling system, two terminal stations, each comprising a quadruplex wireless telegraph transmitting and receiving system, quadruplex wire telegraph systems operatively associated respectively with said wireless telegraph systems, and an intermediately located quadruplex wireless telegraph relaying system.

15. In a signaling system, a quadruplex wireless telegraph relaying system comprising a wireless telegraph transmitting system adapted to develop electromagnetic waves of two definite frequencies, a wireless telegraph receiving system adapted to selectively absorb the energies of electromagnetic waves of two definite frequencies each different from the frequencies of the waves developed by said transmitting system, and a wire telegraph system operatively associating said transmitting and receiving systems.

16. In a signaling system, two terminal stations, each comprising a multiplex wireless telegraph transmitting and receiving system, multiplex wire telegraph systems associated respectively with said wireless telegraph systems, an intermediate two-way multiplex wireless telegraph relaying system and means whereby the terminal station operators may "break" through the intermediary of said wireless telegraph relaying system.

17. In a signaling system, two terminal stations, each comprising a diplex wireless telegraph transmitting and receiving system, diplex wire telegraph systems operatively associated respectively with said wireless telegraph systems an intermediately located two-way diplex wireless telegraph relaying system and means whereby the terminal station operators may "break" through the intermediary of said wireless telegraph relaying system.

18. In a signaling system, two terminal stations, each comprising a duplex wireless telegraph transmitting and receiving system, duplex wire telegraph systems operatively associated respectively with said wireless telegraph systems, an intermediately-located duplex wireless telegraph relaying system, and means whereby the terminal station operators may "break" through the intermediary of said wireless telegraph relaying system.

19. In a signaling system, two terminal stations, each comprising a quadruplex wireless telegraph transmitting and receiving system, quadruplex wire telegraph systems operatively associated respectively with said wireless telegraph systems, an intermediate quadruplex wireless telegraph relaying system and means whereby the terminal station operator may "break" through the intermediary of said wireless telegraph relaying system.

In testimony whereof, I have hereunto subscribed my name this 8th day of Mch. 1906.

SEWALL CABOT.

Witnesses:
E. B. TOMLINSON,
GEO. K. WOODWORTH.